United States Patent
Hur et al.

(10) Patent No.: US 12,459,402 B2
(45) Date of Patent: Nov. 4, 2025

(54) DIFFERENTIAL POWER HORIZONTAL-VERTICAL SWITCHABLE ACTUATOR MODULE

(71) Applicants: DAEWONSANUP CO., LTD., Ansan-si (KR); NAMYANG NEXMO CO., LTD, Ansan-si (KR)

(72) Inventors: Sun Ho Hur, Seoul (KR); Dong Kyu Lee, Ansan-si (KR); Tae Hyung Kim, Siheung-si (KR); Dong Hwi Kim, Ansan-si (KR); Seung Hee Noh, Gwangmyeong-si (KR); Hyun Soo Yoon, Yangju-si (KR); Jin Yong Hong, Ansan-si (KR)

(73) Assignees: DAEWONSANUP CO., LTD., Ansan-si (KR); NAMYANG NEXMO CO., LTD, Ansan-si (KR)

( * ) Notice: Subject to any disclaimer, the term of this patent is extended or adjusted under 35 U.S.C. 154(b) by 103 days.

(21) Appl. No.: 18/290,221

(22) PCT Filed: Jun. 17, 2022

(86) PCT No.: PCT/KR2022/008623
§ 371 (c)(1),
(2) Date: Nov. 10, 2023

(87) PCT Pub. No.: WO2022/270830
PCT Pub. Date: Dec. 29, 2022

(65) Prior Publication Data
US 2024/0262260 A1    Aug. 8, 2024

(30) Foreign Application Priority Data

Jun. 21, 2021 (KR) .......... 10-2021-0080210

(51) Int. Cl.
*B60N 2/06* (2006.01)
*B60N 2/02* (2006.01)

(52) U.S. Cl.
CPC ......... *B60N 2/02253* (2023.08); *B60N 2/067* (2013.01)

(58) Field of Classification Search
CPC .............................. B60N 2/02253; F16H 1/16
See application file for complete search history.

(56) References Cited

U.S. PATENT DOCUMENTS

| | | | |
|---|---|---|---|
| 11,370,327 B2 | 6/2022 | Lee et al. | |
| 12,240,359 B2 * | 3/2025 | Fuchs | .......... B60N 2/067 |

(Continued)

FOREIGN PATENT DOCUMENTS

| | | | |
|---|---|---|---|
| DE | 4318481 A1 * | 12/1994 | ......... B60N 2/02246 |
| JP | 2020-002959 A | 1/2020 | |

(Continued)

OTHER PUBLICATIONS

Machine translation of DE-4318481-A1 (Year: 1994).*

(Continued)

*Primary Examiner* — Randell J Krug
(74) *Attorney, Agent, or Firm* — Bridgeway IP Law Group, PLLC; Sang Ho Lee; Hyun Woo Shin (57) ABSTRACT

The present disclosure relates to a differential power horizontal-vertical switchable actuator module, the differential power horizontal-vertical switchable actuator module including: an actuator which rotates a horizontal drive shaft formed in the horizontal direction as a whole; a first gearbox which is connected to one side end of the horizontal drive shaft and transfers rotational power from the one side of the horizontal drive shaft by switching the direction to a first vertical rotation shaft that is in the vertical direction as a whole; and a second gearbox which is connected to the other (Continued)

side end of the horizontal drive shaft and transfers rotational power from the other side of the horizontal drive shaft by switching the direction to a second vertical rotation shaft that is in the vertical direction as a whole.

16 Claims, 10 Drawing Sheets

(56) References Cited

U.S. PATENT DOCUMENTS

| | | | |
|---|---|---|---|
| 2003/0042387 A1 | 3/2003 | Schuler et al. | |
| 2016/0194024 A1* | 7/2016 | Kikuchi | F16H 1/16 180/444 |
| 2019/0393755 A1 | 12/2019 | Pydin | |

FOREIGN PATENT DOCUMENTS

| | | |
|---|---|---|
| KR | 10-2010-0064074 A | 6/2010 |
| KR | 10-2012-0107548 A | 10/2012 |
| KR | 10-2019-0083477 A | 7/2019 |
| KR | 10-2020-0086301 A | 7/2020 |
| KR | 10-2164948 B1 | 10/2020 |

OTHER PUBLICATIONS

Korean Intellectual Property Office, "Request for the Submission of an Opinion" issued for Korean priority Application No. 10-2021-0080210 on Sep. 19, 2022.

Korean Intellectual Property Office, "Written Decision of Registration" issued for Korean priority Application No. 10-2021-0080210 on Jan. 20, 2023.

* cited by examiner

DIFFERENTIAL POWER HORIZONTAL-VERTICAL SWITCHABLE ACTUATOR MODULE

STATEMENT REGARDING SPONSORED RESEARCH OR DEVELOPMENT

The research and development of the present invention were conducted with the support of the Korea Institute of Advancement of Technology (KIAT) with the financial resources of the Ministry of Trade, Industry and Energy (MOTIE) from the World Class Plus Program (Project Number: P0021941, Detailed Project Identifier: 1415189597). The title of this research project is "Establishment of the Base for Autonomous Vehicle Test Driving-Based Electric/Electronic Parts and Materials" (Research Period: Jun. 1, 2022-Dec. 31, 2025, Supervising Company: Daewonsanup Co., Ltd.).

TECHNICAL FIELD

The present invention relates to a differential power horizontal-vertical switchable actuator module, and more specifically, to a differential horizontal-vertical switchable actuator module that is installed on a seat bogie on which a seat of a vehicle is installed and which can move along a rail so as to allow a power transmission function and a self-locking function to be performed.

BACKGROUND ART

Generally, conventional long-slide devices are configured to include a linear bar-shaped lower rail that extends longitudinally in the forward and backward directions to enable the movement of a vehicle seat forward and backward, and a front-to-back movable bogie, with a seat frame fixed on one side, that can move forward and backward along the lower rail. The lower rail is entirely formed as a straight section, allowing the vehicle seat to move forward and backward in a straight line.

Such conventional linear long-slide devices cannot avoid rear wheel housings protruding into the interior space. Therefore, only the lower rail in the forward and backward directions are installed, or additional left-and-right direction rails, extending between the lower rail and the seat frame in the left and right directions, are installed to allow left and right movement of the vehicle seat during the forward and backward movement of the seat, thus avoiding the rear wheel housings.

However, these conventional long-slide devices with a linear lower rail and a linear left-right rail can only be operated manually by the user. The user cannot simultaneously perform linear manual operation and left-right manual operation. They are limited to sequential manual operations, such as left-right manual operation after forward-backward manual operation or forward-backward manual operation after left-right manual operation. This leads to significant inconvenience during use.

In addition, in the past, when applying left and right rails to the inside the seat, it required a certain amount of space in the height direction, which raised the seat's seating height and became a spatial hindrance to the application of other convenient functions of the seat.

On the other hand, recent trends in the widespread use of autonomous vehicles have led to the development of vehicle seats that can change their shape to be positioned at various locations within the interior space, all within the boundaries of existing safety regulations. However, in practice, there have been significant challenges in designing the technical configurations for lower rail, capable of moving along a curved section, and front-to-back movable bogies.

In particular, to move along a curved section and height-changing section, it is necessary to transmit different rotation speeds in the left and right directions of the seat bogie on which the vehicle's seat is installed. Furthermore, a self-locking function is essential to prevent the seat bogie from moving on its own when it stops. However, in the past, it was very difficult to configure these functions with a limited number of components.

DETAILED DESCRIPTION OF THE INVENTION

Technical Problem

The present invention aims to solve various problems including the problems described above. An object of the present invention is to provide a differential power horizontal-vertical switchable actuator module that employs a differential structure corresponding to left and right rotation deviation and is applicable to a seat bogie capable of traveling on a curved rail without interruptions, and which allows maximum stress drive even with a single motor, enabling the implementation of 2WD and 4WD drive modes when two motors are applied, thereby significantly reducing production costs, and also allows a self-locking function to be performed by utilizing a compact structure that reduces the number of components through the use of a worm gear set, a differential gear set, and a planet gear set, thereby reducing noise, vibration, and clearance issues, enhancing component assembly and durability, greatly improving operational precision and reliability, and enabling variable speed control and quiet operation using a BLDC (brushless DC electric motor) motor. However, the above object is illustrative only, and does not limit the scope of the present invention.

Technical Solution

According to an aspect of the present invention for solving the above problems, a differential power horizontal-vertical switchable actuator module may include: an actuator which rotates a horizontal drive shaft formed in the horizontal direction as a whole; a first gear box which is connected to one side end of the horizontal drive shaft and transfers rotational power from the one side of the horizontal drive shaft by switching the direction to a first vertical rotation shaft that is in the vertical direction as a whole; and a second gearbox which is connected to the other side end of the horizontal drive shaft and transfers rotational power from the other side of the horizontal drive shaft by switching the direction to a second vertical rotation shaft that is in the vertical direction as a whole.

Additionally, according to the present invention, the actuator may include a case; a motor installed inside the case and configured to rotate a motor rotation shaft; and a differential gear set installed on one end of the motor rotation shaft to allow a first rotation speed of the first vertical rotation shaft of the first gearbox and a second rotation speed of the second vertical rotation shaft of the second gearbox to rotate at different speeds.

In addition, according to the present invention, the motor rotation shaft may be a flexible wire that has the one end connected to the differential gear set and the other end forming the other side end of the horizontal drive shaft and is made of a flexible material to alleviate torsion or bending at both ends.

In addition, according to the present invention, the differential gear set may include a rotating cage cover rotatably supported relative to the motor; a first differential side gear connected to the one end of the motor rotation shaft and having a bevel gear shape; at least one differential longitudinal gear with a bevel gear shape that has one end engaged with the first differential side gear; a rotating cage rotatably supporting the differential longitudinal gear with a pin; and a second differential side gear forming the one side end of the horizontal drive shaft and having a bevel gear shape that engages with the other side of the differential longitudinal gear.

Moreover, according to the present invention, the first gearbox may include a housing; a worm gear set that is rotatably installed on one side of the housing using bearings and connected to the one side end of the horizontal drive shaft; and a planet gear set that is rotatably installed on the other side of the housing using bearings and connected to the worm gear set.

In addition, according to the present invention, the worm gear set may include a worm shaft connected to the one side end of the horizontal drive shaft; a worm gear formed on the worm shaft; and a worm wheel gear that engages with the worm gear to switch the direction of driving force of the worm shaft, which is overall in the horizontal direction, to a vertical direction.

In addition, according to the present invention, the worm gear may be a wide-toothed worm gear or an hourglass worm gear with an increased engaging area so as to provide a high reduction ratio, thereby allowing a self-locking (anti-reversal) function to be performed, and the worm wheel gear may be a wide-toothed worm wheel gear or a concave worm wheel gear.

Additionally, according to the present invention, the planet gear set may include a sun gear shaft having one side on which the worm wheel gear is installed; a sun gear formed on the sun gear shaft; at least one or more planetary gears arranged to mesh with each other around the sun gear; an internal gear formed in a ring shape to mesh with the planetary gears; and a carrier shaft that rotatably supports the planetary gears and forms the first vertical rotation shaft.

In addition, according to the present invention, three planetary gears may be arranged in a triangular configuration around the sun gear.

In addition, according to the present invention, the planet gear set may have the sun gear as an input, the internal gear fixed, and the carrier shaft as an output to allow a self-locking function to be performed by increasing a reduction ratio.

In addition, according to the present invention, the differential power horizontal-vertical switchable actuator module may further include a coupling device installed between the actuator and the first gearbox to transmit driving power from the horizontal drive shaft to the first gearbox.

Additionally, according to the present invention, the coupling device may include a first coupling dog installed on the one side end of the horizontal drive shaft; a flexible coupler that engages with the first coupling dog and is made of resilient material to absorb shocks; and a second coupling dog that engages with the flexible coupler and is connected to the worm shaft of the first gearbox.

In addition, according to the present invention, the first vertical rotation shaft of the first gearbox may be connected to a first drive gear or a first drive wheel installed on one side of a seat bogie so as to allow the seat bogie with a seat of a vehicle installed thereon to move along a rail, and the second vertical rotation shaft of the second gearbox may be connected to a second drive gear or a second drive wheel installed on the other side of the seat bogie.

In addition, according to the present invention, a differential gear set may be installed on the actuator to drive the first vertical rotation shaft of the first gearbox and the second vertical rotation shaft of the second gearbox by using a single motor and to allow a first rotation speed of the first vertical rotation shaft and a second rotation speed of the second vertical rotation shaft to rotate at different speeds in a curved section of the rail.

Moreover, according to the present invention, the differential power horizontal-vertical switchable actuator module may further include a clearance compensation device that applies pressure to the worm shaft in the direction of the worm wheel gear to prevent loosening of the worm gear and the worm wheel gear.

In addition, according to the present invention, the clearance compensation device may be a ball plunger that is installed in the housing to enable threaded forward and backward movement and uses elastic restoring force of an elastic ball at the tip thereof to apply pressure to the bearing of the worm shaft.

Advantageous Effects

According to some embodiments of the present invention as described above, a differential power horizontal-vertical switchable actuator module employs a differential structure corresponding to left and right rotation deviation and is applicable to a seat bogie capable of traveling on a curved rail without interruption. In addition, it allows for maximum stress drive even with a single motor, enabling 2WD and 4WD drive modes when two motors are applied, thus significantly reducing production costs, and also allows a self-locking function to be performed by utilizing a compact structure that reduces the number of components through the use of a worm gear set, a differential gear set, and a planet gear set, thereby reducing noise, vibration, and clearance issues, enhancing component assembly and durability, greatly improving operational precision and reliability, and enabling variable speed control and quiet operation using a BLDC (brushless DC electric motor) motor. However, the above effects do not limit the scope of the present invention.

MODE FOR INVENTION

The present invention will now be described in detail in connection with preferred exemplary embodiments with reference to the accompanying drawings.

The invention may, however, be embodied in different forms and should not be construed as limited to the embodiments set forth herein. Rather, these embodiments are provided so that this disclosure will be thorough and complete, and will fully convey the scope of the invention to those skilled in the art. Moreover, in the drawing figures, the thickness or dimensions of layers may be exaggerated for clarity of illustration and convenience.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to drawings that are schematic illustrations of idealized embodiments of the invention. As such, variations from the shapes of the drawings as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Hereinafter, a differential power horizontal-vertical switchable actuator module 100 according to various embodiments of the present invention will be described in detail with reference to the drawings.

Figure 1:
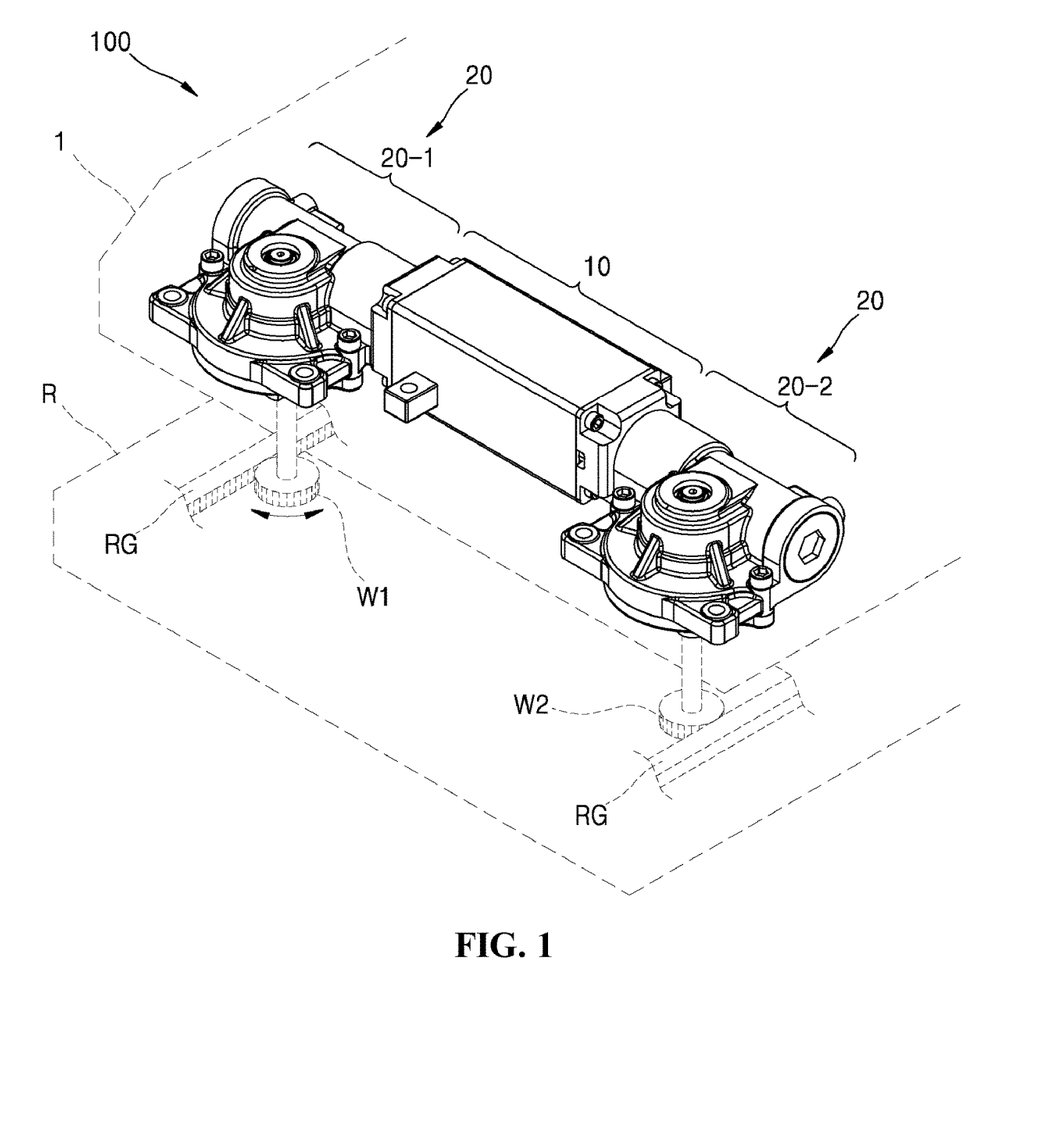
FIG. 1 is an exterior perspective view of a differential power horizontal-vertical switchable actuator module according to some embodiments of the present invention.
Figure 2:
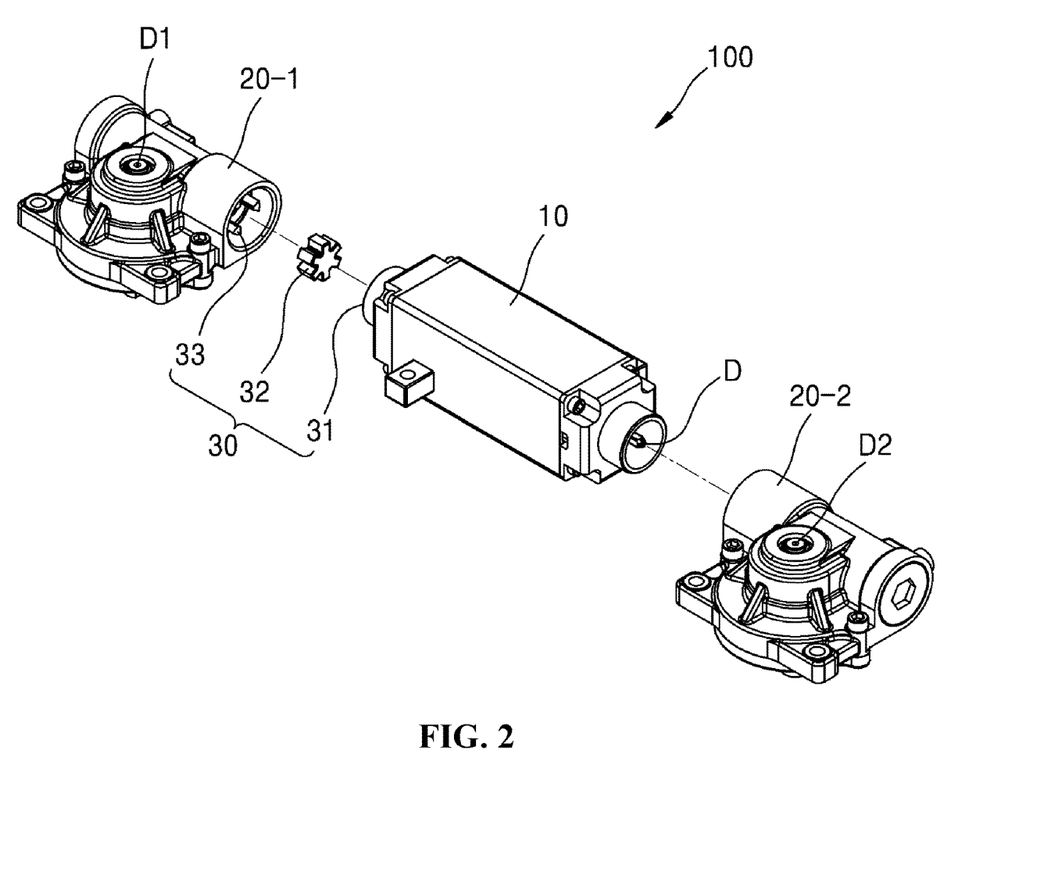
FIG. 2 is an exploded perspective view of an actuator, a first gearbox, and a second gearbox of the differential power horizontal-vertical switchable actuator module shown in FIG. 1.

FIG. 1 is an exterior perspective view of a differential power horizontal-vertical switchable actuator module 100 according to some embodiments of the present invention, and FIG. 2 is an exploded perspective view of an actuator 10, a first gearbox 20-1, and a second gearbox 20-2 of the differential power horizontal-vertical switchable actuator module 100 of FIG. 1.

First, as shown in FIGS. 1 and 2, the differential power horizontal-vertical switchable actuator module 100 according to some embodiments of the present invention may mainly include an actuator 10 and a gearbox 20.

For example, as shown in FIGS. 1 and 2, the actuator 10 may be a device that includes a rotating device for rotating a horizontal drive shaft D formed horizontally overall and differential power transmission devices.

In addition, for example, as shown in FIGS. 1 and 2, the gearbox 20 may include a first gearbox 20-1 connected to the left end of the horizontal drive shaft D and configured to transfer rotational power from the left side of the horizontal drive shaft D by switching the direction to a first vertical rotation shaft D1 that is in the vertical direction as a whole, and a second gearbox 20-2 connected to the right end of the horizontal drive shaft D and configured to transfer rotational power from the right side of the horizontal drive shaft D by switching the direction to a second vertical rotation shaft D2 that is in the vertical direction as a whole.

Here, as shown in FIGS. 1 and 2, the first vertical rotation shaft D1 of the first gearbox 20-1 may be connected to a first drive gear W1 or a first drive wheel installed on one side of a seat bogie 1 so as to allow the seat bogie 1 with a seat of a vehicle installed thereon to move along a rail R. The second vertical rotation shaft D2 of the second gearbox 20-2 may be connected to a second drive gear W2 or a second drive wheel installed on the other side of the seat bogie 1.

As shown in FIG. 1, the first drive gear W1 and the second drive gear W2 may engage with a rack gear RG installed on one side of the rail R, enabling the movement of the seat bogie 1.

Therefore, the differential power horizontal-vertical switchable actuator module 100 of the present invention may differentially separate horizontal driving power generated in the overall horizontal direction into the left and right sides, allowing it to correspond to the rotational speed deviation, i.e., the left and right speed deviation, between the first drive gear W1 and the second drive gear W2 even in a curved section or height changing section of the rail R.

Figure 3:
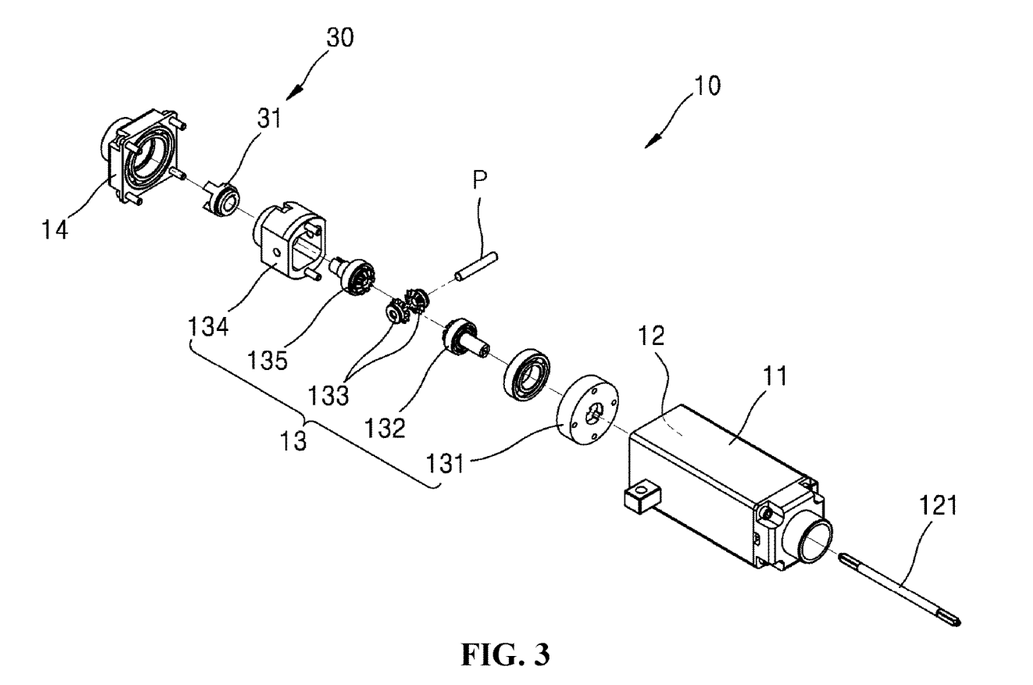
FIG. 3 is an exploded perspective view showing in detail the components of the actuator of the differential power horizontal-vertical switchable actuator module shown in FIG. 2.

FIG. 3 is an exploded perspective view showing in detail the components of the actuator 10 of the differential power horizontal-vertical switchable actuator module 100 of FIG. 2.

As shown in FIG. 3, the actuator 10 of the differential power horizontal-vertical switchable actuator module 100 according to some embodiments of the present invention may be a device integrated with the horizontal drive shaft D formed in the horizontal direction as a whole and configured to drive the first gearbox 20-1 and the second gearbox 20-2 on the left and right sides to enable rotation around the first vertical rotation shaft D1 and the second vertical rotation shaft D2, respectively. The actuator 10 may include a case 11, a motor 12 installed inside the case 11 and configured to rotate a motor rotation shaft 121, a differential gear set 13 installed on one end of the motor rotation shaft 121 to allow a first rotation speed of the first vertical rotation shaft D1 of the first gearbox 20-1 and a second rotation speed of the second vertical rotation shaft D2 of the second gearbox 20-2 to rotate at different speeds, and a motor cover 14 that seals the case 11.

Here, for example, as shown in FIG. 3, the motor rotation shaft 121 may be a flexible wire that has the one end connected to the differential gear set 13 and the other end forming the other side end of the horizontal drive shaft D and is made of a flexible material to alleviate torsion or bending at both ends.

Additionally, for example, the motor 12 may be of a hollow type that allows a drive shaft to penetrate through the center thereof and may be a variable speed controllable BLDC (brushless DC electric motor) motor. However, it is not necessarily limited to this and various types of motors may be applied.

More specifically, as shown in FIG. 3, the differential gear set 13 may include a rotating cage cover 131 rotatably supported relative to the motor 12, a first differential side gear 132 connected to one end of the motor rotation shaft 121 and having a bevel gear shape, at least one differential longitudinal gear 133 with a bevel gear shape that has one end engaged with the first differential side gear 132, a rotating cage 134 that is formed in a shape surrounding the differential longitudinal gears 133 and rotatably supports the differential longitudinal gear 133 with a pin P, and a second differential side gear 135 forming one side end of the horizontal drive shaft D and having a bevel gear shape that engages with the other side of the differential longitudinal gear 133.

That is, as shown in FIGS. 1 to 3, in the actuator 10 of the differential power horizontal-vertical switchable actuator module 100 according to some embodiments of the present invention, the differential gear set 13 may be installed to drive the first vertical rotation shaft D1 of the first gearbox 20-1 and the second vertical rotation shaft D2 of the second gearbox 20-2 by using a single motor 12 and to allow the first rotation speed of the first vertical rotation shaft D1 and the second rotation speed of the second vertical rotation shaft D2 to rotate at different speeds in a curved section of the rail R.

Therefore, the rotational driving force of the motor rotation shaft 121 may be directly transmitted to the first differential side gear 132, but it may be indirectly transmitted to the second differential side gear 135 through the differential longitudinal gear 133 and the rotating cage 134. Consequently, under normal circumstances, the rotational driving force may be transmitted using the differential gear set 13 with equal rotational speeds at the left end of the horizontal drive shaft D and the right end of the horizontal drive shaft D. However, in cases where, for example, the rotational speed of the left end of the horizontal drive shaft D comes to a halt due to external forces on curved rail R, the rotational speed of the right end of the horizontal drive shaft D doubles, enabling curved driving without overloading the components.

Therefore, according to the present invention, it is possible to apply it to the application to a seat bogie 1 capable of automatic moving on a curved rail R, and it is possible to achieve 2WD differential drive with a single motor, significantly reducing production costs. Furthermore, with two motors, 4WD differential drive is also achievable.

Figure 4:
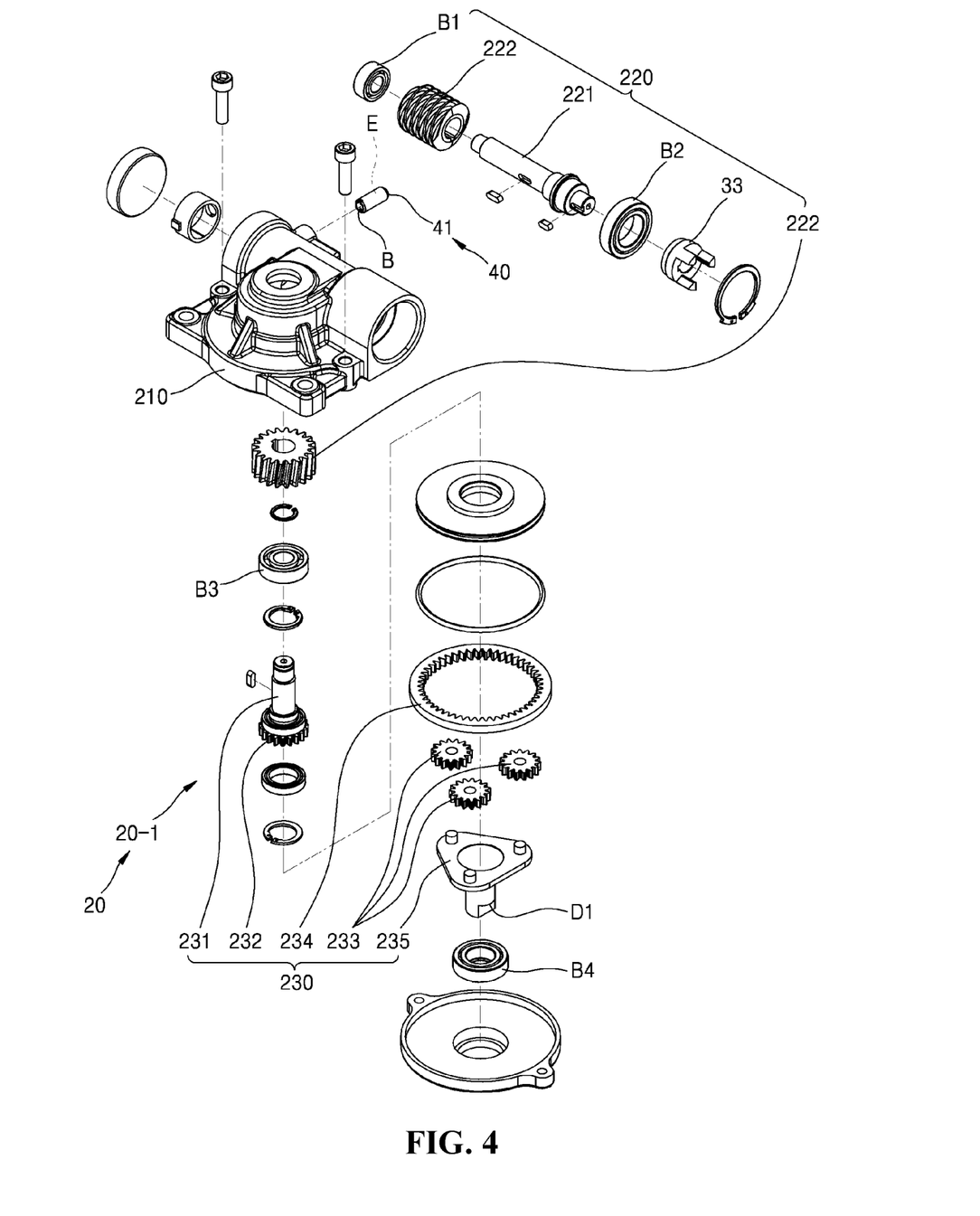
FIG. 4 is an exploded perspective view showing in detail the components of the first gearbox of the differential power horizontal-vertical switchable actuator module shown in FIG. 2.

FIG. 4 is an exploded perspective view showing in detail the components of the first gearbox 20-1 of the differential power horizontal-vertical switchable actuator module 100 shown in FIG. 2.

As shown in FIG. 4, the first gearbox 20-1 of the differential power horizontal-vertical switchable actuator module 100 according to some embodiments of the present invention may include a housing 210, a worm gear set 220 that is rotatably installed on one side of the housing 210 using bearings B1 and B2 and connected to one side end of the horizontal drive shaft D, and a planet gear set 230 that is rotatably installed on the other side of the housing 210 using bearings B3 and B4 and connected to the worm gear set 220.

For example, as shown in FIGS. 1 to 4, the worm gear set 220 may include a worm shaft 221 connected to one side end of the horizontal drive shaft D, a worm gear 222 formed on the worm shaft 221, and a worm wheel gear 223 that engages with the worm gear 222 to switch the direction of driving force of the worm shaft 221, which is overall in the horizontal direction, to the vertical direction.

Here, the worm gear 222 may be a wide-toothed worm gear with an increased engaging area or an hourglass worm gear to provide a high reduction ratio, thereby allowing the self-locking (anti-reversal) function to be performed. The worm wheel gear 223 may be a wide-toothed worm wheel gear or a concave worm wheel gear.

Therefore, using the worm gear 222 and the worm wheel gear 223 with a very high reduction ratio, driving force may be transmitted from the worm gear 222 to the worm wheel gear 223, but not in the reverse direction, making the self-locking function possible.

In addition, as shown in FIGS. 1 to 4, the planet gear set 230 of the differential power horizontal-vertical switchable actuator module 100 according to some embodiments of the present invention may include a sun gear shaft 231 having one side on which the worm wheel gear 223 is installed, a sun gear 232 formed on the sun gear shaft 231, at least one or more planetary gears 233 arranged to mesh with each other around the sun gear 232, an internal gear 234 formed in a ring shape to mesh with the planetary gears 233, and a carrier shaft 235 that rotatably supports the planetary gears 233 and forms the first vertical rotation shaft D1.

Here, three planetary gears 233 may be arranged in a triangular configuration around the sun gear 232. However, it is not necessarily limited to this, and a plurality of planetary gears 233, such as four, five, six, or more, may be arranged in a polygonal configuration around the sun gear 232.

To allow the self-locking function to be performed by increasing a reduction ratio, the planet gear set 230 may have the sun gear 232 as the input, the internal gear 234 fixed, and the carrier shaft 235 as the output.

For example, if a reduction ratio of the worm gear set 220 is applied as 10:1 and a reduction ratio of the planet gear set 230 is applied as 3.63:1, the total reduction ratio is 36.3:1, which is very high. This high reduction ratio makes reverse motion impossible, allowing the self-locking function to be performed. Especially, the twisting angle of the worm gear set 220 is within 7 degrees, so even if the driving force to the motor 12 is interrupted, the seat bogie 1 can be held securely in place without the need for a separate brake device.

On the other hand, as shown in FIGS. 1 to 4, the differential power horizontal-vertical switchable actuator module 100 according to some embodiments of the present invention may further include a coupling device 30 installed between the actuator 10 and the first gearbox 20-1 to transmit driving power from the horizontal drive shaft D to the first gearbox 20-1.

More specifically, for example, the coupling device 30 may include a first coupling dog 31 installed on one side end of the horizontal drive shaft D, a flexible coupler 32 that engages with the first coupling dog 31 and is made of resilient material to absorb shocks, and a second coupling dog 33 that engages with the flexible coupler 32 and is connected to the worm shaft 221 of the first gearbox 20-1.

Therefore, by using the coupling device 30, power from the horizontal drive shaft D may be transmitted to the first gearbox 20-1, and when necessary, the coupling device 30 may be easily disassembled to replace or repair its components.

Additionally, for example, as shown in FIGS. 1 to 4, the differential power horizontal-vertical switchable actuator module 100 according to some embodiments of the present invention may further include a clearance compensation device 40 that applies pressure to the worm shaft 221 in the direction of the worm wheel gear 223 to prevent loosening of the worm gear 222 and the worm wheel gear 223.

More specifically, for example, the clearance compensation device 40 may be a ball plunger 41 that is installed in the housing 210 to enable threaded forward and backward movement and uses the elastic restoring force of an elastic ball B at the tip thereof to apply pressure to the bearing B1 of the worm shaft 221.

Therefore, even if loosening occurs over prolonged use in the worm gear 222 and the worm wheel gear 223, the clearance compensation device 40 may ensure that the ball plunger 41 consistently applies pressure to the bearing B1 using the elastic spring E, thereby allowing the worm gear 222 and the worm wheel gear 223 to remain in close contact with each other, thus facilitating smooth power transmission.

Figure 5:
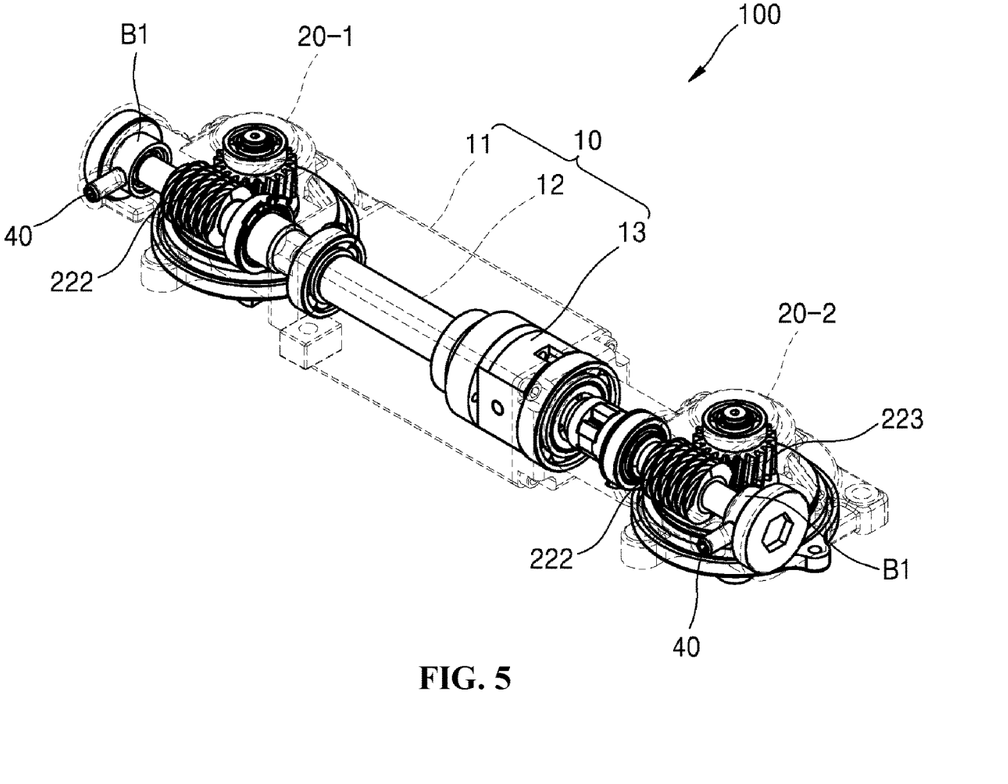
FIG. 5 is a cross-sectional view showing the interior of the differential power horizontal-vertical switchable actuator module shown in FIG. 1.
Figure 6:
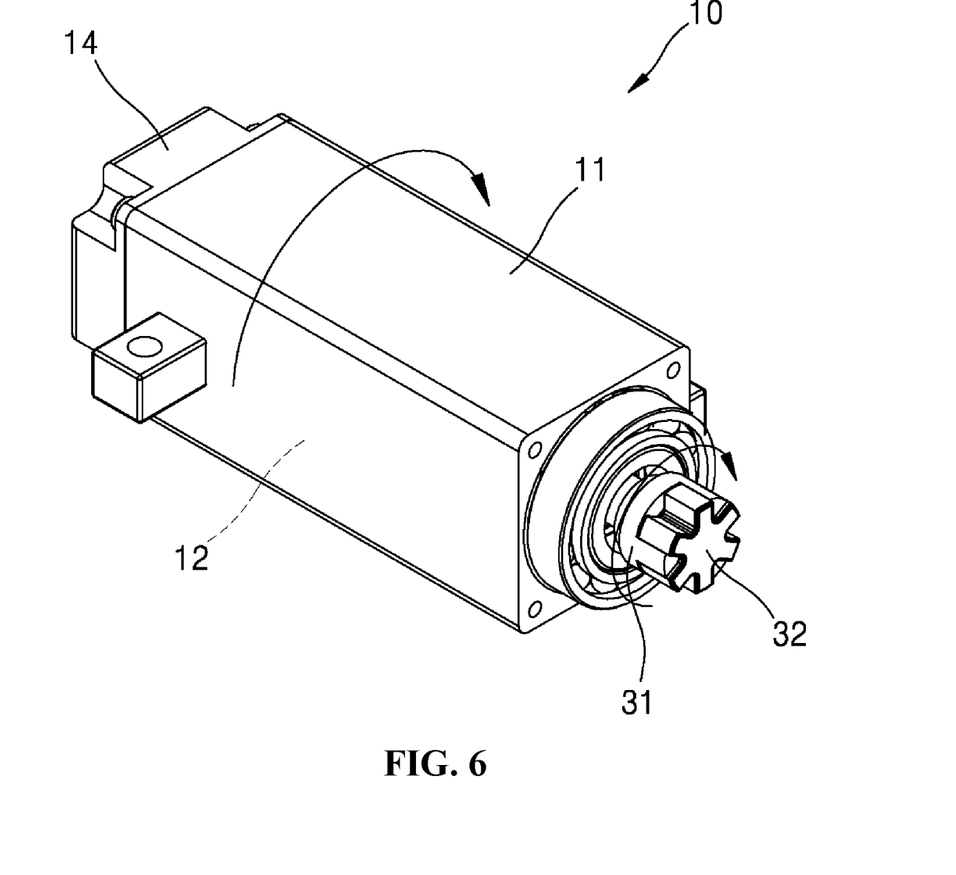
FIG. 6 is a perspective view of the actuator of the differential power horizontal-vertical switchable actuator module shown in FIG. 1.
Figure 7:
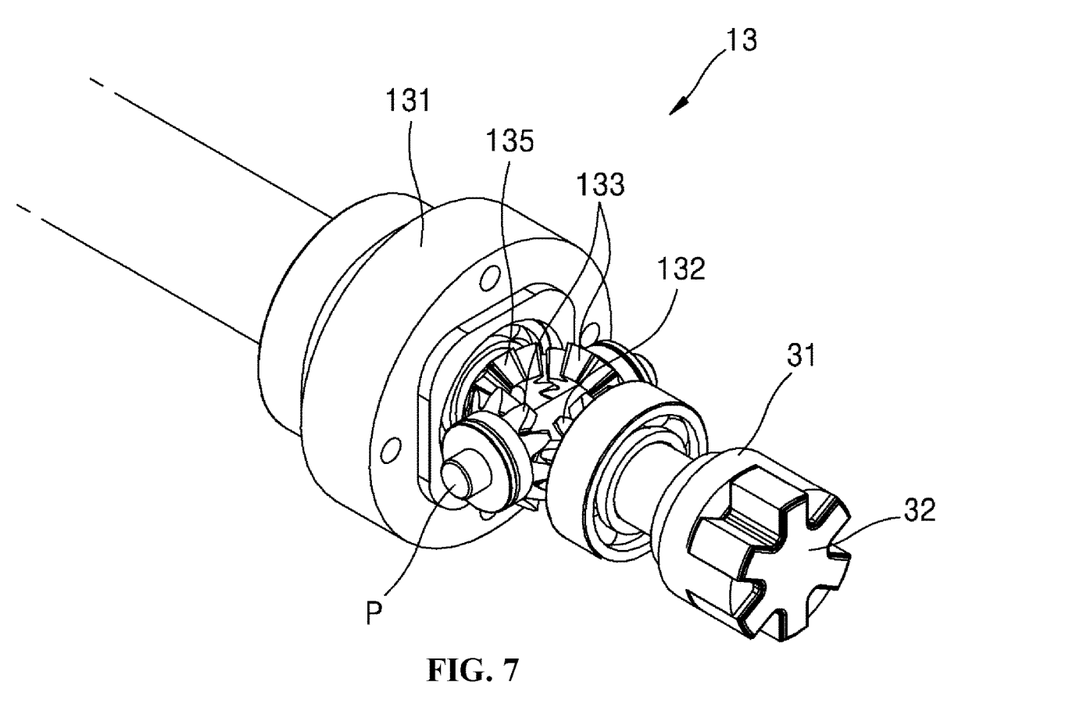
FIG. 7 is a perspective view showing a differential power set of the differential power horizontal-vertical switchable actuator module shown in FIG. 6.

FIG. 5 is a cross-sectional view showing the interior of the differential power horizontal-vertical switchable actuator module 100 shown in FIG. 1, FIG. 6 is a perspective view of the actuator 10 of the differential power horizontal-vertical switchable actuator module 100 shown in FIG. 1, and FIG. 7 is a perspective view showing a differential power set of the differential power horizontal-vertical switchable actuator module shown in FIG. 6.

As shown in FIGS. 5 to 7, in the operation process of the differential power horizontal-vertical switchable actuator module 100 according to some embodiments of the present invention, first, using the motor 12 and the differential gear set 13 of the actuator 10, horizontal driving power generated in the overall horizontal direction is differentially separated into the left and right sides, allowing the driving power to be transmitted corresponding to the rotational speed deviation, i.e., the left-right speed deviation, between the first drive gear W1 and the second drive gear W2 even in a curved section or height changing section of the rail R.

Figure 8:
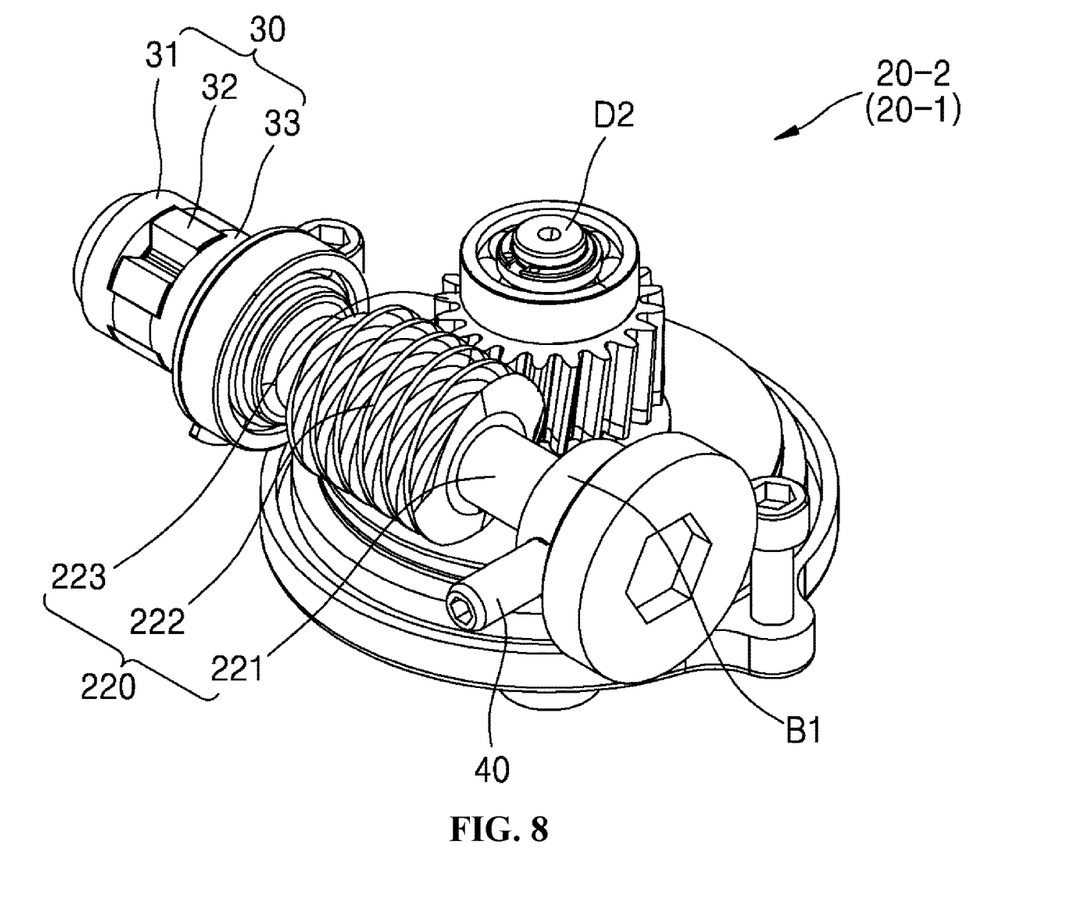
FIGS. 8 to 10 are perspective views showing a worm gear set and a planet gear set of the differential power horizontal-vertical switchable actuator module shown in FIG. 1.
Figure 9:
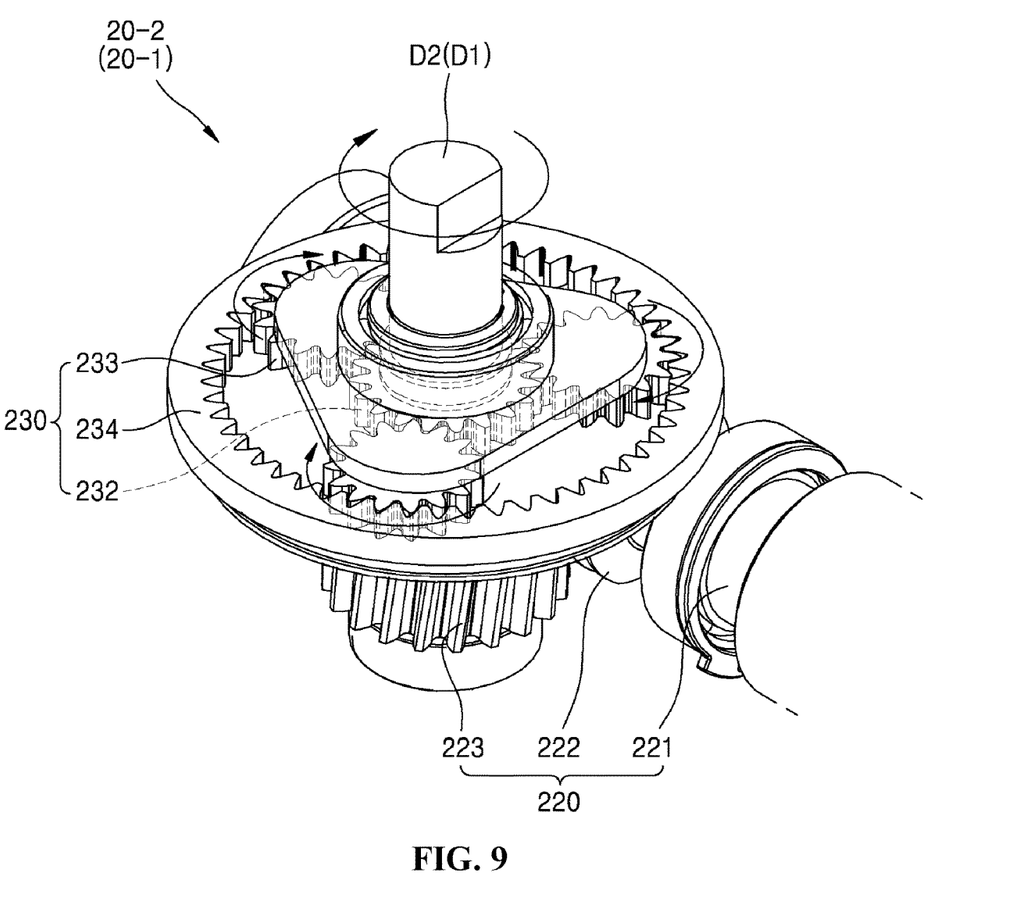
Figure 10:
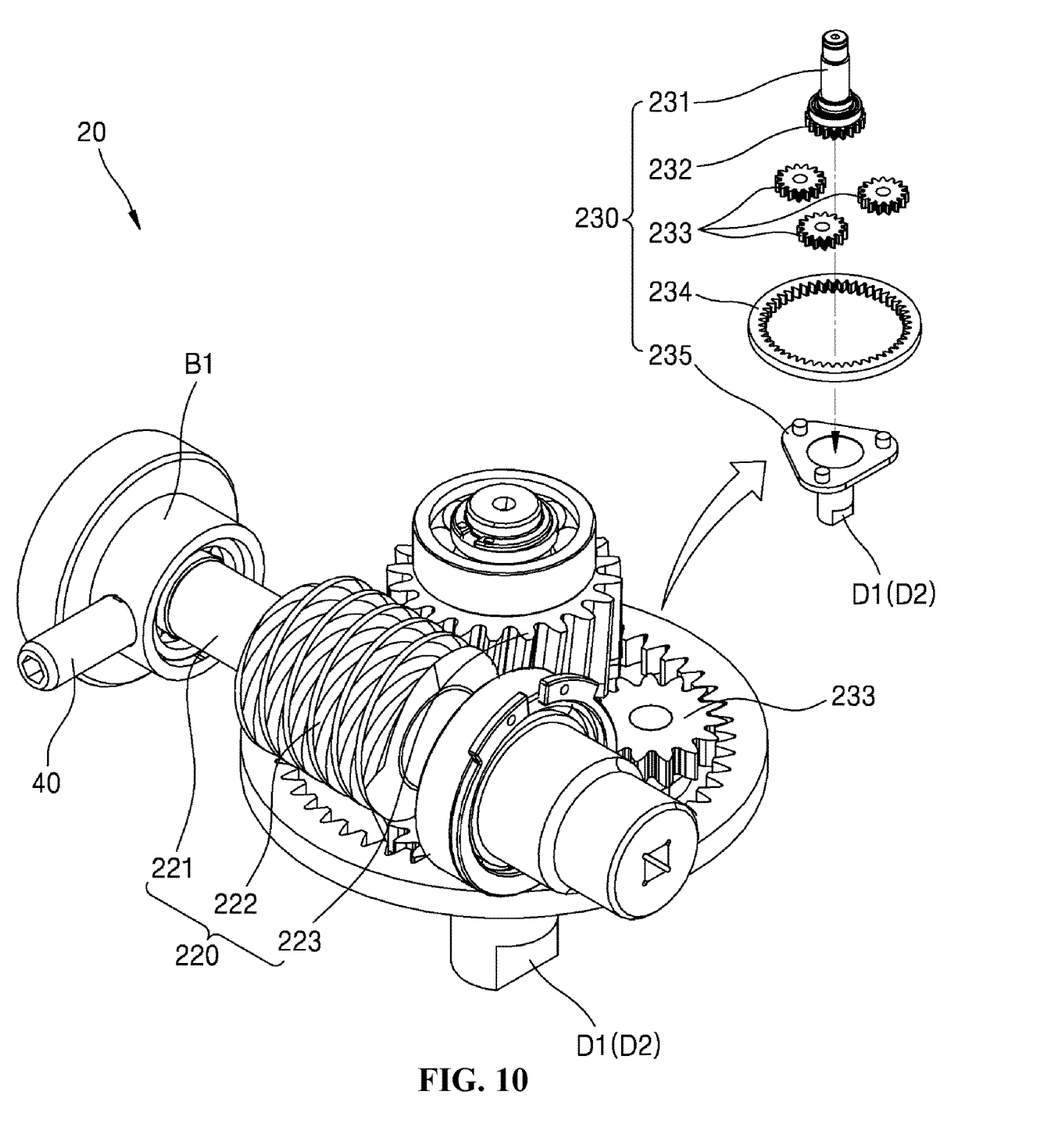

FIGS. 8 to 10 are perspective views showing the worm gear set 220 and the planet gear set 230 of the differential power horizontal-vertical switchable actuator module 100 shown in FIG. 1.

Subsequently, for example, when the driving force of the actuator 10 may be transmitted to the worm gear 222 and the worm shaft 221 is rotated, the worm wheel gear 223, engaged with the worm gear 222, may rotate with a significant reduction ratio.

Then, as the sun gear shaft 231 having one side on which the worm wheel gear 223 is installed rotates, the sun gear 232 may rotate. As three fixed planetary gears 233, arranged in a triangle configuration around the sun gear 232, rotates, the carrier shaft 235 that forms the first vertical rotation shaft D1 may rotate with an even greater reduction ratio.

Therefore, it can be applied to the seat bogie 1 capable of automatic movement on curved rails R. It allows for maximum stress drive even with a single motor 12, enabling 2WD and 4WD drive modes when two motors are applied, thus significantly reducing production costs. By combining the differential gear set 13, the worm gear set 220, and the planet gear set 230 into a compact structure with fewer components, it allows the self-locking function to be performed, reducing noise, vibration, and clearance issues, enhancing component assembly and durability, greatly improving operational precision and reliability, and enabling variable speed control and quiet operation using a BLDC motor.

On the other hand, the differential power horizontal-vertical switchable actuator module 100 according to some embodiments of the present invention is not limited to being installed only on a seat bogie with a car seat installed thereon capable of moving along rails but may also be applied to various other bogies capable of movement.

Although the present invention has been described in connection with the exemplary embodiment shown in the drawings, it is only illustrative. It will be understood by those skilled in the art that various modifications and equivalents can be made without departing from the scope and spirit of the invention. Therefore, the scope of the present invention should be defined only by the appended claims.

The invention claimed is:

1. A differential power horizontal-vertical switchable actuator module comprising:
   an actuator which rotates a horizontal drive shaft formed in the horizontal direction as a whole,
   the actuator having:
     a case,
     a motor installed inside the case and configured to rotate a motor rotation shaft, and
     a differential gear set installed on one end of the motor rotation shaft;
   a first gearbox which is connected to one side end of the horizontal drive shaft and transfers rotational power from the one side of the horizontal drive shaft by switching the direction to a first vertical rotation shaft that is in the vertical direction as a whole; and
   a second gearbox which is connected to the other side end of the horizontal drive shaft and transfers rotational power from the other side of the horizontal drive shaft by switching the direction to a second vertical rotation shaft that is in the vertical direction as a whole,
   wherein the differential gear set is configured to allow a first rotation speed of the first vertical rotation shaft of the first gearbox and a second rotation speed of the second vertical rotation shaft of the second gearbox to rotate at different speeds.

2. The differential power horizontal-vertical switchable actuator module of claim 1, wherein the motor rotation shaft is a flexible wire that has the one end connected to the differential gear set and the other end forming the other side end of the horizontal drive shaft and is made of a flexible material to alleviate torsion or bending at both ends.

3. The differential power horizontal-vertical switchable actuator module of claim 1, wherein the differential gear set comprises:
   a rotating cage cover rotatably supported relative to the motor;
   a first differential side gear connected to the one end of the motor rotation shaft and having a bevel gear shape;
   at least one differential longitudinal gear with a bevel gear shape that has one end engaged with the first differential side gear; a rotating cage rotatably supporting the differential longitudinal gear with a pin; and
   a second differential side gear forming the one side end of the horizontal drive shaft and having a bevel gear shape that engages with the other side of the differential longitudinal gear.

4. The differential power horizontal-vertical switchable actuator module of claim 1, wherein the motor is of a hollow type that allows a drive shaft to penetrate through a center thereof and is a variable speed controllable brushless DC electric motor (BLDC) motor.

5. The differential power horizontal-vertical switchable actuator module of claim 1, further comprising a coupling device installed between the actuator and the first gearbox to transmit driving power from the horizontal drive shaft to the first gearbox.

6. The differential power horizontal-vertical switchable actuator module of claim 5, wherein the coupling device comprises:
   a first coupling dog installed on the one side end of the horizontal drive shaft;
   a flexible coupler that engages with the first coupling dog and is made of resilient material to absorb shocks; and
   a second coupling dog that engages with the flexible coupler and is connected to the worm shaft of the first gearbox.

7. The differential power horizontal-vertical switchable actuator module of claim 1, wherein the first vertical rotation shaft of the first gearbox is connected to a first drive gear or a first drive wheel installed on one side of a seat bogie so as to allow the seat bogie with a seat of a vehicle installed thereon to move along a rail, and the second vertical rotation shaft of the second gearbox is connected to a second drive gear or a second drive wheel installed on the other side of the seat bogie.

8. The differential power horizontal-vertical switchable actuator module of claim 7, wherein the differential gear set is installed on the actuator to drive the first vertical rotation shaft of the first gearbox and the second vertical rotation shaft of the second gearbox by using a single motor and to allow the first rotation speed of the first vertical rotation shaft and the second rotation speed of the second vertical rotation shaft to rotate at different speeds in a curved section of the rail.

9. The differential power horizontal-vertical switchable actuator module of claim 1, wherein the first gearbox comprises:
a housing;
a worm gear set that is rotatably installed on one side of the housing using bearings and connected to the one side end of the horizontal drive shaft; and
a planet gear set that is rotatably installed on the other side of the housing using bearings and connected to the worm gear set.

10. The differential power horizontal-vertical switchable actuator module of claim 9, wherein the worm gear set comprises:
a worm shaft connected to the one side end of the horizontal drive shaft;
a worm gear formed on the worm shaft; and
a worm wheel gear that engages with the worm gear to switch the direction of driving force of the worm shaft, which is overall in the horizontal direction, to a vertical direction.

11. The differential power horizontal-vertical switchable actuator module of claim 10, wherein the worm gear is a wide-toothed worm gear or an hourglass worm gear with an increased engaging area so as to raise a reduction ratio, thereby allowing a self-locking (anti-reversal) function to be performed, and the worm wheel gear is a wide-toothed worm wheel gear or a concave worm wheel gear.

12. The differential power horizontal-vertical switchable actuator module of claim 10, wherein the planet gear set comprises:
a sun gear shaft having one side on which the worm wheel gear is installed; a sun gear formed on the sun gear shaft;
at least one or more planetary gears arranged to mesh with each other around the sun gear; an internal gear formed in a ring shape to mesh with the planetary gears; and
a carrier shaft that rotatably supports the planetary gears and forms the first vertical rotation shaft.

13. The differential power horizontal-vertical switchable actuator module of claim 12, wherein three planetary gears are arranged in a triangular configuration around the sun gear.

14. The differential power horizontal-vertical switchable actuator module of claim 13, wherein the planet gear set has the sun gear as an input, the internal gear fixed, and the carrier shaft as an output to allow a self-locking function to be performed by increasing a reduction ratio.

15. The differential power horizontal-vertical switchable actuator module of claim 10, further comprising a clearance compensation device that applies pressure to the worm shaft in the direction of the worm wheel gear to prevent loosening of the worm gear and the worm wheel gear.

16. The differential power horizontal-vertical switchable actuator module of claim 15, wherein the clearance compensation device is a ball plunger that is installed in the housing to enable threaded forward and backward movement and uses elastic restoring force of an elastic ball at the tip thereof to apply pressure to the bearing of the worm shaft.

* * * * *